(12) United States Patent  
Ekpenyong et al.

(10) Patent No.: US 10,206,181 B2
(45) Date of Patent: Feb. 12, 2019

(54) SIMULTANEOUS TRANSMISSION IN MULTIPLE TIMING ADVANCE GROUPS

(71) Applicant: Texas Instruments Incorporated, Dallas, TX (US)

(72) Inventors: Anthony Edet Ekpenyong, Houston, TX (US); Ralf Matthias Bendlin, Plano, TX (US); Pierre Bertrand, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/752,863

(22) Filed: Jan. 29, 2013

(65) Prior Publication Data

US 2013/0195048 A1  Aug. 1, 2013

Related U.S. Application Data

(60) Provisional application No. 61/592,155, filed on Jan. 30, 2012.

(51) Int. Cl.
 *H04W 52/32* (2009.01)
 *H04W 74/08* (2009.01)
 *H04W 52/28* (2009.01)
 *H04W 52/40* (2009.01)
 *H04W 52/48* (2009.01)

(52) U.S. Cl.
 CPC ..... *H04W 52/325* (2013.01); *H04W 74/0833* (2013.01); *H04W 52/281* (2013.01); *H04W 52/40* (2013.01); *H04W 52/48* (2013.01)

(58) Field of Classification Search
 CPC ... H04W 52/00; H04W 52/04; H04W 52/146; H04W 52/325
 USPC .................................................. 370/329, 328
 See application file for complete search history.

(56) References Cited

U.S. PATENT DOCUMENTS

| | | | |
|---|---|---|---|
| 8,687,541 B2* | 4/2014 | Lohr et al. | 370/318 |
| 2010/0027484 A1* | 2/2010 | Imamura | H04W 74/0866 370/329 |
| 2010/0041428 A1* | 2/2010 | Chen | H04W 52/16 455/522 |
| 2010/0272212 A1* | 10/2010 | Miyoshi | H04L 5/0044 375/295 |
| 2010/0323745 A1* | 12/2010 | Chen | H04W 52/325 455/522 |
| 2012/0008510 A1* | 1/2012 | Cai | H04B 7/0404 370/252 |
| 2012/0057547 A1* | 3/2012 | Lohr | H04L 5/0007 370/329 |
| 2012/0127931 A1* | 5/2012 | Gaal | H04L 1/1861 370/329 |

(Continued)

*Primary Examiner* — George C Atkins
(74) *Attorney, Agent, or Firm* — Gregory J. Albin; Charles A. Brill; Frank D. Cimino

(57) ABSTRACT

Systems and methods for specifying UE power control allocation for simultaneous transmission of PRACH in a secondary serving cell and PUCCH/PUSCH/SRS in a different serving cell in another timing advance group are disclosed. Rules are provided for prioritizing transmission of PRACH and/or other UL channels/signals. Additionally, UE power allocation is controlled for misaligned subframes across different timing advance groups. Latency of UL synchronization for a secondary serving cell is reduced by prioritizing PRACH retransmission.

16 Claims, 2 Drawing Sheets

(56) References Cited

U.S. PATENT DOCUMENTS

| | | | |
|---|---|---|---|
| 2013/0058315 A1* | 3/2013 | Feuersanger | H04W 52/281 370/336 |
| 2013/0114505 A1* | 5/2013 | Haim | H04W 52/146 370/328 |
| 2013/0188580 A1* | 7/2013 | Dinan | H04W 52/281 370/329 |
| 2013/0195084 A1* | 8/2013 | Chen | H04W 72/0413 370/336 |
| 2013/0196707 A1* | 8/2013 | Baldemair | H04B 7/0626 455/522 |
| 2014/0050205 A1* | 2/2014 | Ahn | H04W 52/146 370/336 |
| 2014/0126475 A1* | 5/2014 | Ahn et al. | 370/328 |
| 2014/0161111 A1* | 6/2014 | Kim | H04W 56/0005 370/336 |
| 2014/0213315 A1* | 7/2014 | Kim | H04W 52/38 455/522 |
| 2017/0223694 A1* | 8/2017 | Han | H04W 16/32 |

* cited by examiner

SIMULTANEOUS TRANSMISSION IN MULTIPLE TIMING ADVANCE GROUPS

CROSS-REFERENCE TO RELATED APPLICATIONS

The present application claims the benefit of the filing date of U.S. provisional patent application No. 61/592,155, filed Jan. 30, 2012, the disclosure of which is hereby incorporated by reference herein in its entirety.

BACKGROUND

The Long Term Evolution (LTE) wireless networks, also known as Evolved Universal Terrestrial Radio Access Network (E-UTRAN), are standardized by the 3GPP working groups. An agreed objective of the carrier aggregation (CA) work item in Release-11 of the LTE standard is the support of multiple timing advance commands for uplink (UL) CA in scenarios where UL timing synchronization for a secondary serving cell (SCell) is sufficiently different from that of the primary serving cell (PCell). Examples of such scenarios include simultaneous (parallel) UL transmission to a macro Evolved Node B (eNB) on one carrier frequency and to a lower power node such as a remote radio head (RRH) on a different intra/inter-band carrier frequency. Consequently, it was agreed to partition aggregated serving cells into one or more timing advance groups (TAGs) according to their UL synchronization requirements. For each TAG, only one serving cell is configured to perform the random access (RA) procedure in order to obtain a timing advance (TA) command, which in turn, is applicable to all serving cells in the TAG. The PCell performs the RA procedure for its TAG. A SCell is configured for the RA procedure in a TAG consisting only of SCells, which is hereafter denoted as a "SCell-TAG."

Several physical layer aspects need to be considered when a user equipment (UE) receives multiple TA commands for different TAGs. These aspects include:
- the permitted combinations of a Physical Random Access Channel (PRACH) transmission on a SCell and transmission of other UL channels and signals (such as Physical Uplink Control Channel (PUCCH), Physical Uplink Shared Channel (PUSCH), and Sounding Reference Symbol (SRS)) on a different serving cell;
- the priorities within a permitted combination pertaining to a PRACH transmission on a SCell and transmission of other UL channels and signals (such as PUCCH, PUSCH, and SRS) on a different serving cell; and
- power limitation and power fluctuation during transmission in one subframe due to subframe misalignment between different TAGs.

An LTE Release-10 UE performs random access only on the PCell (i.e., all configured serving cells derive their UL timing from the PCell timing). For LTE Release-11, it has been agreed that when a SCell-TAG is configured:
- there is one timing alignment timer (TAT) per TAG;
- non-contention based RA is adopted for a SCell;
- when the TAT associated with the PCell expires, all TAT's are considered expired (i.e., the UE flushes all Hybrid Automatic Repeat Request (HARQ) buffers, clears any configured assignments/grants, and Radio Resource Control (RRC) releases PUCCH/SRS for all configured serving cells; and
- when the TAT associated with an SCell TAG expires:
  SRS transmissions in the SCell TAG shall be stopped and the Type 0 SRS configuration is released;
  Channel Quality Indicator (CQI)/Precoder Matrix Indication (PMI)/Rank Indicator (RI) reporting configuration for the SCells is maintained; and
  Medium Access Control (MAC) flushes all uplink HARQ buffers for the concerned SCells.

For LTE Release-10 CA, a UE that is not configured for simultaneous PUCCH/PUSCH transmission transmits uplink control information (UCI) on the PUCCH if it is not scheduled for PUSCH transmission. Conversely, the UE multiplexes Uplink Shared Channel (UL-SCH) data and UCI on the PUSCH if it has an UL grant. On the other hand, if an LTE Release-10 UE is configured for simultaneous PUCCH/PUSCH transmission it can, for example, transmit HARQ-acknowledgement (ACK) feedback on the PUCCH and multiplex CSI with UL-SCH data on the PUSCH in the same subframe. In case the total required power for a subframe would exceed the maximum power capability, an LTE Release-10 UE shall prioritize UL transmission as follows:

PUCCH>PUSCH multiplexed with UCI>PUSCH without UCI.

In other words, PUCCH has the highest priority, followed by PUSCH multiplexed with UCI, and then PUSCH without UCI has the lowest priority.

Furthermore, PUSCH power is scaled down while the PUCCH power is preserved in order to meet the UE's maximum transmit power capability PCMAX (i) in subframe i.

Adopting the LTE Release-10 non-contention based random access, the UE may be scheduled for PRACH transmission on a SCell via a Physical Downlink Control Channel (PDCCH) order. It is assumed that there is no PUSCH/SRS transmission in any SCell of the SCell-TAG because the UE is not UL-synchronized for the SCell-TAG. Therefore, the main issue for further study are the permitted combinations of PRACH on a SCell and PUCCH/PUSCH/SRS in a different TAG(s).

SUMMARY

Embodiments of the invention provide systems and methods for specifying UE power control procedures for simultaneous transmission of PRACH in a secondary serving cell and PUCCH/PUSCH/SRS in a different serving cell in another timing advance group. Rules are provided for prioritizing transmission of PRACH and/or other UL channels/signals. Additionally, UE power allocation is controlled for misaligned subframes across different timing advance groups. Latency of UL synchronization for a secondary serving cell is reduced by prioritizing PRACH transmissions.

In one embodiment, a UE device receives a Physical Downlink Control Channel (PDCCH) order to initiate a random access procedure on a first secondary serving cell. The UE also identifies that it is scheduled to transmit on the Physical Uplink Control Channel (PUCCH) or Physical Uplink Shared Channel (PUSCH) of a second serving cell, which is in a different TAG with respect to the first serving cell. The UE transmits the PRACH transmission to the first serving cell in a subframe and transmits the PUCCH or PUSCH transmission to the second serving cell in the same subframe.

The UE may scale a transmission power level for the PUCCH, PUSCH or SRS during the subframe so that a combined transmission power level for the PRACH transmission and the PUCCH, PUSCH or SRS transmission does not exceed a maximum transmission power for the user equipment.

The UE may determine that the PRACH transmission will be retransmitted in a second subframe. The UE may increase the power level of the PRACH transmission during the second subframe and/or increase the transmission priority value for the PRACH transmission during the second subframe.

In another embodiment, the UE device may identify a first transmission for a first serving cell during a subframe and identify a second transmission for a second serving cell during the subframe. If the UE identifies a transmission time difference between the first transmission and the second transmission within the subframe, then it scales the transmission power levels for the first transmission or the second transmission or both prior to a start of the subframe so that a combined transmission power level for the first transmission and the second transmission does not exceed a maximum transmission power for the user equipment. A constant transmission power may be assigned to all symbols in the first and second transmissions. The first and second transmissions may be one or more of PUCCH, PUSCH, PRACH, or SRS transmissions.

In another embodiment, the UE device may identify a first transmission for a first serving cell during a subframe and identify a second transmission for a second serving cell during the same subframe. If the UE identifies a transmission time difference between the first transmission and the second transmission within the subframe, and the combined transmission power of both transmissions in an overlap period within the subframe would exceed the maximum transmission power of the UE, the UE shall scale the transmission power levels for the first transmission or the second transmission or both within the overlap period so that a combined transmission power level for the first transmission and the second transmission does not exceed a maximum transmission power for the user equipment. The first and second transmissions may be one or more of PUCCH, PUSCH, PRACH, or SRS transmissions.

BRIEF DESCRIPTION OF THE DRAWINGS

Figure 1:
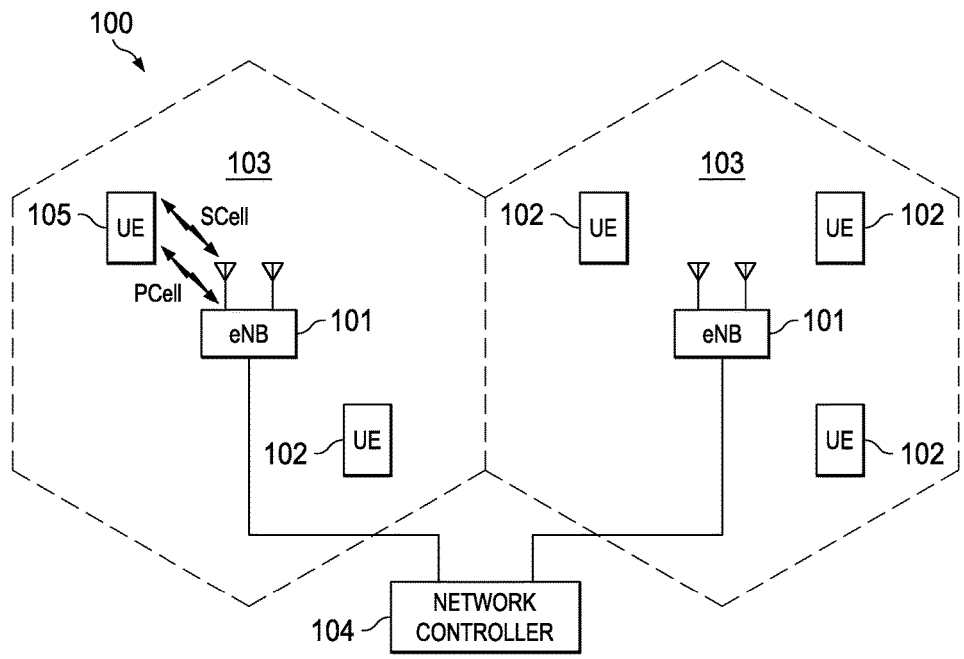

Having thus described the invention in general terms, reference will now be made to the accompanying drawings, wherein:

FIG. 1 is a block diagram of a wireless communication network according to one embodiment.

Figure 2:
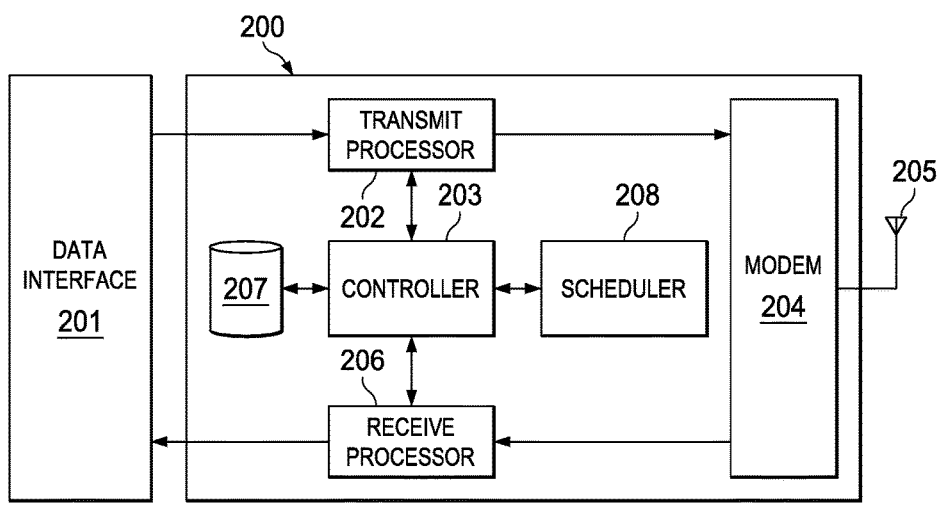

FIG. 2 is a high level block diagram of a system that may be used as an eNB or UE according to embodiments described herein.

Figure 3A:
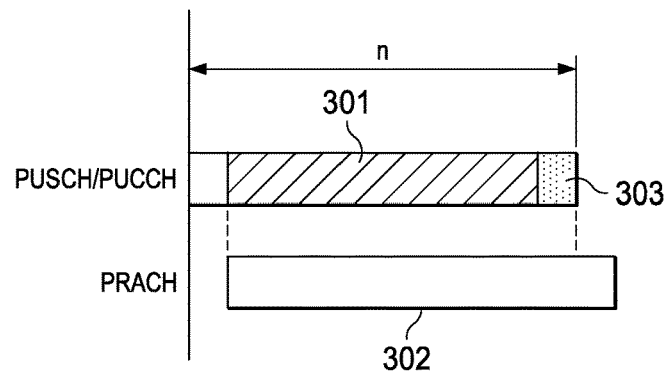

FIG. 3A illustrates a full overlap between PUSCH or PUCCH or SRS in one TAG and PRACH in another TAG in a subframe.

Figure 3B:
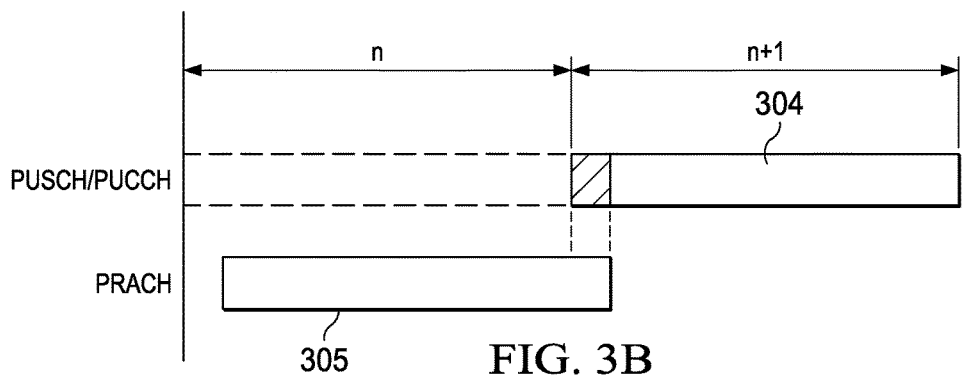

FIG. 3B illustrates a partial overlap between PUCCH or PUSCH in one TAG and PRACH in another TAG in a subframe.

Figure 4:
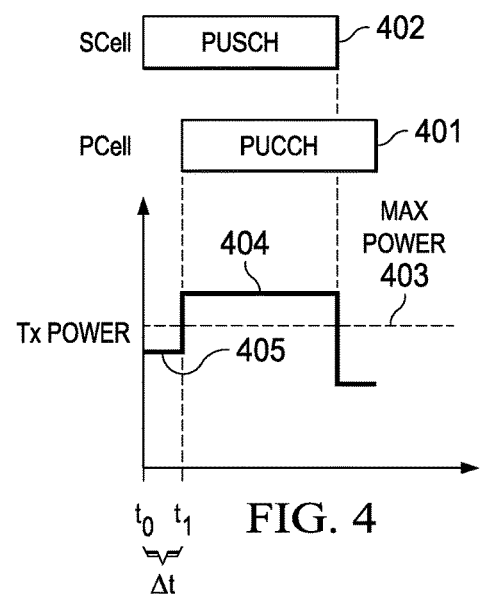

FIG. 4 illustrates a subframe offset for a PUCCH transmission in one serving cell with respect to a PUSCH transmission in another serving cell.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a wireless communication network 100, which may be an LTE network that utilizes orthogonal frequency-division multiple access (OFDMA) on the downlink and single-carrier frequency division multiple access (SC-FDMA) on the uplink. LTE partitions system bandwidth into multiple orthogonal subcarriers, which may be referred to as frequency tones or frequency bins. Each subcarrier may be modulated with data, control, or reference signals. The wireless network 100 includes a number of evolved Node Bs (eNBs) 101 and other network entities. The eNBs 101 communicate with user equipment devices (UEs) 102, 105. Each eNB 101 provides communication services for a particular geographic area or "cell" 103, which may be a macro cell, a pico cell, a femto cell, and/or other types of cell. A network controller 104 may be coupled to a set of eNBs 101 and provide coordination and control for these eNBs 101.

UEs 102, 105 may be stationary or mobile and may be located throughout the wireless network 100. UEs 102, 105 may be referred to as a terminal, a mobile station, a subscriber unit, a station, such as a mobile telephone, a personal digital assistant (PDA), a wireless modem, a laptop or notebook computer, a tablet, and the like. A UE 102 communicates with an eNB 101 serving the cell 103 in which the UE 102 is located.

A UE 102 may communicate with more than one eNB 101 if the cells 103 of the eNBs 101 overlap. One eNB 101 will be the primary cell (PCell) and the other eNBs 101 will be secondary serving cells (SCell).

FIG. 2 is a high level block diagram of a system 200 that may be used as an eNB or UE, which may be, for example, eNB 101 or UE 102 in FIG. 1. System 200 receives data to be transmitted from an interface 201 at transmit processor 202. The data may include, for example, audio or video information or other data file information to be transmitted on a PUSCH. The transmit processor 202 may also receive control information to be transmitted on a PRACH, PUCCH, PUSCH, or SRS, from a controller 203. Transmit processor 202 processes (e.g., encode and symbol map) the data and control information to obtain data symbols, control symbols, and reference symbols. The transmit processor 202 may also perform spatial processing or precoding on the data symbols and/or the control symbols and reference symbols. The output of the transmit processor 202 is provided to a modem 204. Modem 204 processes the output symbol stream from the transmit processor 202 to obtain an output sample stream that is further processed by converting to analog, amplifying, and upconverting before being transmitted via antenna 205. In other embodiments, multiple modems 204 may be used to support multiple-input multiple-output (MIMO) transmission on multiple antennas 205.

Signals are also received at system 200 on antenna 205 from other devices. The received signals are provided to modern 204 for demodulation. Modem 204 processes the signals by filtering, amplifying, downconverting, and/or digitizing, for example, to obtain input samples. Modem 204 or a receive processor 206 may further process the input samples to obtain received symbols. Receive processor 206 then processes the symbols by demodulating, deinterleaving, and/or decoding, for example. Receive processor 206 then provides decoded data to interface 201 for use by the eNB or UE Receive processor further provides decoded control information to controller 203.

Controller 203 may direct the operation of system 200 in the eNB or UE, such as by adjusting timing and power levels. A memory 207 may store data and program codes for controller 203, transmit processor 202, and/or receive processor 206. Additional components, such as a scheduler 208 may schedule downlink and/or uplink data transmission on one or more component carriers by system 200 (e.g., in an eNB).

In the present invention a UE is said to be power limited if the UE is scheduled to transmit multiple channels or signals in a subframe and the combined transmission power of all the transmissions within a part or whole of the subframe would exceed the maximum transmission power capability of the UE.

There are two clear options when PRACH is scheduled for a SCell-TAG and PUCCH/PUSCH/SRS is scheduled in another TAG: allow or disallow simultaneous transmission of PRACH and PUCCH/PUSCH/SRS. If simultaneous transmission is disallowed, the following observations about prioritizing a specific UL channel/signal may be considered:

PRACH-only transmission or PRACH transmission prioritized over PUCCH/PUSCH.

The purpose of the PRACH is to achieve UL synchronization on the SCells associated with the same TAG in a timely manner. This is independent of downlink (DL) transmission on the PDSCH, which relies on HARQ-ACK and CSI feedback, to optimize the DL transmission efficiency and avoid unnecessary re-transmissions. Therefore, there may be significant degradation in DL performance if PUCCH transmission is dropped when it occurs in the same subframe with a PRACH transmission on a SCell.

Advantages of PRACH-only transmission: it may be argued that the SCell RA procedure is quite infrequent so the impact on UCI transmission is quite small. For example, the impact of dropping a CSI report should be negligible for low mobility scenarios.

Disadvantages of PRACH-only transmission: While the preceding statement may be acceptable for Frequency Division Duplexing (FDD), it may lead to unacceptable performance for Time Division Duplexing (TDD) where up to M=4 (or M=9) DL subframes need to be acknowledged in one UL subframe. Additionally, the Random Access Channel (RACH) preamble transmission may span multiple subframes, where PUCCH and PUSCH are dropped.

PUCCH/PUSCH transmission prioritized over PRACH.

With this option the PRACH can be dropped when it coincides with PUCCH/PUSCH transmission on other serving cells. For PUCCH or UCI on PUSCH this option ensures that there is no degradation in DL performance but it adds some latency to achieving UL-synchronization on the SCell-TAG. Similarly, dropping PRACH in favor of PUSCH ensures there is no degradation in UL PUSCH performance.

Advantages of prioritizing PUCCH/PUSCH: for non-contention based random access the eNB can avoid collision between SCell PRACH and PUSCH/PUCCH/SRS transmission in a different TAG by scheduling PRACH when there are no DL transmissions requiring HARQ-ACK feedback or PUSCH transmissions.

Disadvantages of prioritizing PUCCH/PUSCH: increased eNB scheduling complexity when handling PUCCH, PUSCH, aperiodic SRS, and PRACH transmissions. Furthermore, for heavy DL data transmission there is no guarantee that PRACH can be scheduled within a reasonable time period.

As discussed above, when a UE is scheduled for PRACH and PUCCH or PUSCH or SRS transmissions at the same time, there are advantages and disadvantages to dropping either PRACH or PUCCH/PUSCH/SRS in favor of the other transmission type. In one embodiment, the UE may simultaneously transmit PRACH on a SCell and transmit other channels or UL signals in a different TAG. In alternative embodiments, rules may be defined for prioritizing or postponing a PRACH transmission when it coincides with a PUCCH, PUSCH and/or SRS transmission if the combined transmission power would exceed the maximum transmission power for the UE.

Various embodiments may use the following proposals for simultaneous transmission of PRACH and PUCCH/PUSCH in a subframe:

Proposal 1: transmission of both the random access preamble and the PUCCH/PUSCH/SRS.

If a random access procedure on a SCell is initiated by a PDCCH order in subframe n, then, if requested by higher layers, the UE transmits the random access preamble in the first subframe $n+k_2$, $k_2 \geq 6$, where a PRACH resource is available. If there is a PUCCH/PUSCH transmission in another serving cell in the same subframe (i.e., subframe $n+k_2$), the UE shall transmit both the random access preamble and the PUCCH/PUSCH transmission.

As a separate embodiment, if a CSI report is scheduled for the PUCCH, and there is no HARQ-ACK feedback in the same subframe used for a PRACH transmission on a SCell, then the CSI report is dropped and PRACH is transmitted. As random access on a SCell is rather infrequent, dropping a CSI report is not expected to have a significant impact on DL throughput.

In case of power limitation for simultaneous PRACH and PUCCH/PUSCH transmissions, prioritization of UL channels/signals is required as in LTE Release-10. In one embodiment, a simple extension to the LTE Release-10 specification is to scale down the PRACH power similar to the PUSCH power. However, it is noted that:

there is no HARQ retransmission feature for PRACH; and the received power at the eNB is lower than the higher-layer configured PREAMBLE_RECEIVED_TARGET_POWER. This complicates eNB receiver design in detecting the PRACH transmission. Equivalently, for the same PRACH receiver there is a higher probability of missed detection.

Following the LTE Release-10 specification, if the UE does not detect a random access response (RAR) within the RA response window, a power ramping procedure is followed wherein the UE increments the PREAMBLE_TRANSMISSION_COUNTER by 1 to boost the received power at the eNB as PREAMBLE_RECEIVED_TARGET_POWER=preambleInitialReceivedTargetPower+DELTA_PREAMBLE+(PREAMBLE_TRANSMISSION_COUNTER−1)*powerRampingStep For heavy DL transmission, it is likely that PRACH retransmissions will collide with PUCCH/PUSCH transmissions. Therefore, increasing the preamble received target power may not produce a different outcome for PRACH reception and it also increases the UL interference caused by the PRACH retransmission. Incrementing the transmit power was designed for pathloss compensation and not to handle power scaling in case of simultaneous transmission of PRACH and PUCCH/PUSCH/SRS. One possible solution is to prioritize PRACH retransmissions in the case of simultaneous transmission of UL channels/signals.

Proposal 2: prioritization of PUCCH in case of power limitation for simultaneous transmission on multiple serving cells.

In one embodiment, PRACH has the same priority as PUSCH transmission without UCI (i.e., PUCCH>PUSCH with UCI>PUSCH without UCI or PRACH). Therefore, if the total transmit power of the UE would exceed $\hat{P}_{CMAX}$ (i), the UE scales the PUSCH or PRACH power, denoted as $\hat{P}_{channel,c}$ (i) for a serving cell c in subframe i such that the condition:

$$\sum_c w(i) \cdot \hat{P}_{channel,c}(i) \leq (\hat{P}_{CMAX}(i) - \hat{P}_{PUCCH}(i)) \quad \text{Eq. (1)}$$

is satisfied where $\hat{P}_{PUCCH}$ (t) is the linear value of $\hat{P}_{PUCCH}$ (i), $\hat{P}_{channel,c}$ (i) is the linear value of either the PUSCH $P_{PUSCH,c}$ (i) or the PRACH $P_{PRACH,c}$ (i).

In another embodiment, PRACH has the same priority as PUSCH transmission with UCI (i.e., PUCCH>PUSCH with UCI or PRACH>PUSCH without UCI).

Proposal 3: UE behavior in case of PRACH retransmission.

If the UE does not detect a RAR within the RA response window for a PRACH transmission on a SCell corresponding to a detected PDCCH order, then the following UE behavior may be specified:

Event 1: At initial transmission, the UE was not power limited. For the re-transmission, the UE is still not power limited. The UE should ramp up. There is no need to change priority.

Event 2: At initial transmission, the UE was power limited due to collisions with UL transmissions in other TAGs. For the re-transmission, the UE is not power limited anymore. The UE may transmit at the initial PRACH transmission nominal power. There may be no need for ramp-up. There is no need for changing priority. The UE increments the PREAMBLE_TRANSMISSION_COUNTER by 1 and sets the powerRampingStep to zero.

Event 3: At initial PRACH transmission, UE was power limited due to collisions with UL transmissions in other TAGs. For the re-transmission, it is still power limited due to collisions with other UL transmissions. Ramping up is ineffective in this case, and the UE should change priority. The UE increments the PREAMBLE_TRANSMISSION_COUNTER by 1 and applies the higher-layer signaled parameter powerRampingStep. The PRACH retransmission is prioritized over all other UL channels/signals (i.e., no scaling is applied to PRACH transmission).

In an alternative embodiment, other UL channels/signals are dropped in case of collision with a PRACH retransmission and the UE is power limited.

In another alternative embodiment, transmit power allocation for other UL channels/signals are scaled down in case of collision with a PRACH retransmission and the UE is power limited.

Event 4: At initial transmission, UE was not power limited. For the re-transmission, the UE is power limited. The UE should ramp up transmit power as in LTE Release-10, but also prioritize PRACH over other UL channels/signals as in Event 3 above.

FIG. 3A illustrates a subframe offset for a PUCCH or PUSCH transmission 301 in the pan with respect to a PRACH transmission 302 in a SCell. Subframe misalignment due to independent timing advances for the PCell and SCell-TAG(s) leads to overlapped SC-FDMA symbol transmissions. SRS transmission 303 in the last symbol of subframe n can also overlap with the PRACH transmission. FIG. 3B illustrates a different subframe offset where the PUCCH or PUSCH transmission 304 is in subframe n+1 whereas PRACH transmission 305 is in subframe n. For both illustrations the PUCCH or PUSCH or SRS transmission can be scaled down if the combined power of PRACH and PUCCH or SRS would exceed the maximum transmission power of the UE.

Power allocation due to subframe misalignment.

FIG. 4 illustrates a subframe offset for a PUCCH transmission 401 in the PCell with respect to a PUSCH transmission 402 in the SCell. Subframe misalignment due to independent timing advances for the PCell and SCell-TAG(s) leads to overlapped SC-FDMA symbol transmissions. For example, PUSCH 402 begins transmitting at time $t_0$; however, PUCCH 401 does not begin transmitting within the same subframe until time $t_1$ due to timing misalignment $\Delta t$. One possible consequence is a transmit power fluctuation within a subframe.

In this scenario, the total required transmit power exceeds the maximum UE power capability 403 when both PUCCH 401 and PUSCH 402 are transmitted simultaneously. When PUSCH 402 begins transmitting, the UE transmit power is at a first level 405; however, when PUCCH 401 begins transmitting within the same subframe, the required power jumps to a second level 404, that exceeds the UE's maximum power level 403. Following the LTE Release-10 specification, the PUCCH 401 transmission would be prioritized over the PUSCH 402 even though the PUSCH 402 transmission started before the PUCCH 401.

It is not desirable to change the PUSCH 402 transmit power within a subframe because this affects the PUSCH receiver design (e.g., QAM demodulation when different SC-FDMA symbols are received with different powers). The relative propagation delay difference between serving cells, including eNB time alignment accuracy, is at most 31.3 µs. Assuming roughly equal DL and UL propagation delays, this timing difference is roughly 50% of an SC-FDMA symbol duration of 66.6 µs. Thus, if the subframe offset $\Delta t$ is within one SC-FDMA symbol, it should be possible for the UE to adjust the total transmit power across multiple serving cells and channel/signal combinations, including power scaling in the case of power limitation, prior to transmission on any serving cell. It shall also be possible for a different UE to the UE to adjust the transmission power only within a subframe offset or overlap period between the two transmissions.

The following proposals address the scenario of FIG. 3 in which overlapping, off-set transmissions exceed the UE's maximum power.

In one embodiment, a constant transmission power is allocated to all SC-FDMA symbols for PUSCH/PUCCH transmission in a subframe.

In another embodiment, when the total transmit power would exceed the maximum transmit power at any point in a subframe, then the power scaling rules are applied prior to transmission of PUSCH/PUCCH/SRS/PRACH on any UL serving cell for the same subframe.

In another embodiment, when the total transmit power would exceed the maximum transmit power for any period in a subframe, then the power scaling rules are applied for that same period of a same subframe for transmission of PUSCH/PUCCH/SRS/PRACH on any UL serving cell.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:
performing by one or more processors in a user equipment device,
receiving a Physical Downlink Control Channel (PDCCH) order to initiate a random access procedure on a serving cell;
identifying a Physical Uplink Control Channel (PUCCH) transmission for a different serving cell other than the serving cell;
transmitting a Physical Random Access Channel (PRACH) transmission to the serving cell in a subframe;
transmitting the PUCCH transmission to the different serving cell in the subframe; and
scaling down the PUCCH transmission power level during a portion of the subframe having overlapping PRACH and PUCCH transmissions so that a combined transmission power level for the PRACH transmission and the PUCCH transmission during the overlapping portion does not exceed a maximum transmission power for the user equipment device.

2. The method of claim 1, wherein:
said scaling down results in a PRACH transmission and no transmission of PUCCH.

3. A method comprising:
performing by one or more processors in a user equipment device:
receiving a Physical Downlink Control Channel (PDCCH) order to initiate a random access procedure on a first serving cell;
identifying a Physical Uplink Control Channel (PUCCH) transmission for a second serving cell other than the first serving cell;
transmitting a Physical Random Access Channel (PRACH) transmission to the first serving cell in a subframe;
transmitting the PUCCH transmission to the second serving cell in the subframe;
determining that the PRACH transmission will be retransmitted in a second subframe; and
increasing a power level of the PRACH transmission during the second subframe.

4. The method of claim 3, further comprising:
identifying one or more other uplink transmissions during the second subframe.

5. A method comprising:
performing by one or more processors in a user equipment device:
receiving a Physical Downlink Control Channel (PDCCH) order to initiate a random access procedure on a first serving cell;
identifying a Physical Uplink Control Channel (PUCCH) or Sounding Reference Symbol (SRS) transmission for a second serving cell other than the first serving cell;
transmitting a Physical Random Access Channel (PRACH) transmission to the first serving cell in a subframe;
transmitting the PUCCH or SRS transmission to the second serving cell in the subframe;
determining that the PRACH transmission will be retransmitted in a second subframe;
identifying one or more other uplink transmissions during the second subframe; and
increasing a transmission priority value for the PRACH transmission during the second subframe.

6. The method of claim 5, further comprising:
increasing a power level of the PRACH transmission during the second subframe.

7. A user equipment device, comprising:
a processor configured to:
identify a Physical Downlink Control Channel (PDCCH) order to initiate a random access procedure on a serving cell;
identify a Physical Uplink Control Channel (PUCCH) transmission for a different serving cell other than the serving cell;
generate a Physical Random Access Channel (PRACH) transmission for the first serving cell in a subframe;
generate the PUCCH transmission for the different serving cell in the subframe;
scale down a PUCCH transmission power level during a portion of the subframe having overlapping PRACH and PUCCH transmissions so that a combined transmission power level for the PRACH transmission and the PUCCH transmission during the overlapping portion does not exceed a maximum transmission power for the user equipment device; and
a modem configured to transmit the PUCCH transmission to one or more base stations.

8. The user equipment device of claim 7, wherein:
the scaling down results in no transmission of PUCCH when a combined transmission of PRACH and PUCCH would exceed a maximum transmission power for the user equipment device.

9. A user equipment device, comprising:
a processor configured to:
identify a Physical Downlink Control Channel (PDCCH) order to initiate a random access procedure on a first serving cell;
identify a Physical Uplink Control Channel (PUCCH) transmission for a second serving cell other than the first serving cell;
generate a Physical Random Access Channel (PRACH) transmission for the first serving cell in a subframe;
generate the PUCCH transmission for the second serving cell in the subframe;
determine that the PRACH transmission will be retransmitted in a second subframe; and
increase a power level of the PRACH transmission during the second subframe; and
a modem configured to transmit the PUCCH or PRACH transmission to one or more base stations.

10. The user equipment device of claim 9, the processor further configured to:
identify one or more other uplink transmissions during the second subframe.

11. A user equipment device, comprising:
a processor configured to:
identify a Physical Downlink Control Channel (PDCCH) order to initiate a random access procedure on a first serving cell;
identify a Physical Uplink Control Channel (PUCCH) or Sounding Reference Symbol (SRS) transmission for a second serving cell other than the first serving cell;
generate a Physical Random Access Channel (PRACH) transmission for the first serving cell in a subframe;

generate the PUCCH or SRS transmission for the second serving cell in the subframe;

determine that the PRACH transmission will be retransmitted in a second subframe;

identify one or more other uplink transmissions during the second subframe; and increase a transmission priority value for the PRACH transmission during the second subframe; and a modem configured to transmit the PUCCH or SRS transmission to one or more base stations.

12. The user equipment device of claim 11, the processor further configured to:

increase a power level of the PRACH transmission during the second subframe.

13. A method comprising:

performing by one or more processors in a user equipment:

identifying a first transmission for a first serving cell during a subframe;

identifying a second transmission for a second serving cell during the subframe; and scaling transmission power levels for only one of the first transmission or the second transmission only during such time that the first transmission and the second transmission overlap so that a combined transmission power level for the first transmission and the second transmission does not exceed a maximum transmission power for the user equipment, wherein the first transmission is a Physical Uplink Control Channel (PUCCH) transmission, and the second transmission is a Physical Random Access Channel (PRACH) transmission.

14. A method comprising:

performing by one or more processors in a user equipment:

identifying a first transmission for a first serving cell during a subframe, wherein a constant transmission power is assigned to all symbols in the first transmission;

identifying a second transmission for a second serving cell during the subframe, wherein a constant transmission power is assigned to all symbols in the second transmission;

identifying a transmission time difference between the first transmission and the second transmission within the subframe; and scaling, responsive to the transmission time difference, transmission power levels for the first transmission or the second transmission or both prior to a start of the subframe so that a combined transmission power level for the first transmission and the second transmission does not exceed a maximum transmission power for the user equipment, wherein the first transmission is a Physical Uplink Control Channel (PUCCH) transmission, and the second transmission is a Physical Random Access Channel (PRACH) transmission.

15. A user equipment device, comprising:

a processor configured to:

identify a first transmission for a first serving cell during a subframe;

identify a second transmission for a second serving cell during the subframe; and scale transmission power levels for only one of the first transmission or the second transmission and only during such time that the first transmission and the second transmission overlap so that a combined transmission power level for the first transmission and the second transmission does not exceed a maximum transmission power for the user equipment device; and a modem configured to transmit the first and second transmissions to one or more base stations, wherein the first transmission is a Physical Uplink Control Channel (PUCCH) transmission, and the second transmission is a Physical Random Access Channel (PRACH) transmission.

16. A user equipment device, comprising:

a processor configured to:

identify a first transmission for a first serving cell during a subframe, wherein a constant transmission power is assigned to all symbols in the first transmission;

identify a second transmission for a second serving cell during the subframe, wherein a constant transmission power is assigned to all symbols in the second transmission;

identify a transmission time difference between the first transmission and the second transmission within the subframe; and scale, responsive to the transmission time difference, transmission power levels for the first transmission or the second transmission or both prior to a start of the subframe so that a combined transmission power level for the first transmission and the second transmission does not exceed a maximum transmission power for the user equipment device; and a modem configured to transmit the first and second transmissions to one or more base stations, wherein the first transmission is a Physical Uplink Control Channel (PUCCH) transmission, and the second transmission is a Physical Random Access Channel (PRACH) transmission.

* * * * *